March 20, 1934.   J. KUBLER   1,951,575
ELECTRIC CURRENT RECTIFYING SYSTEM
Filed Jan. 18, 1930
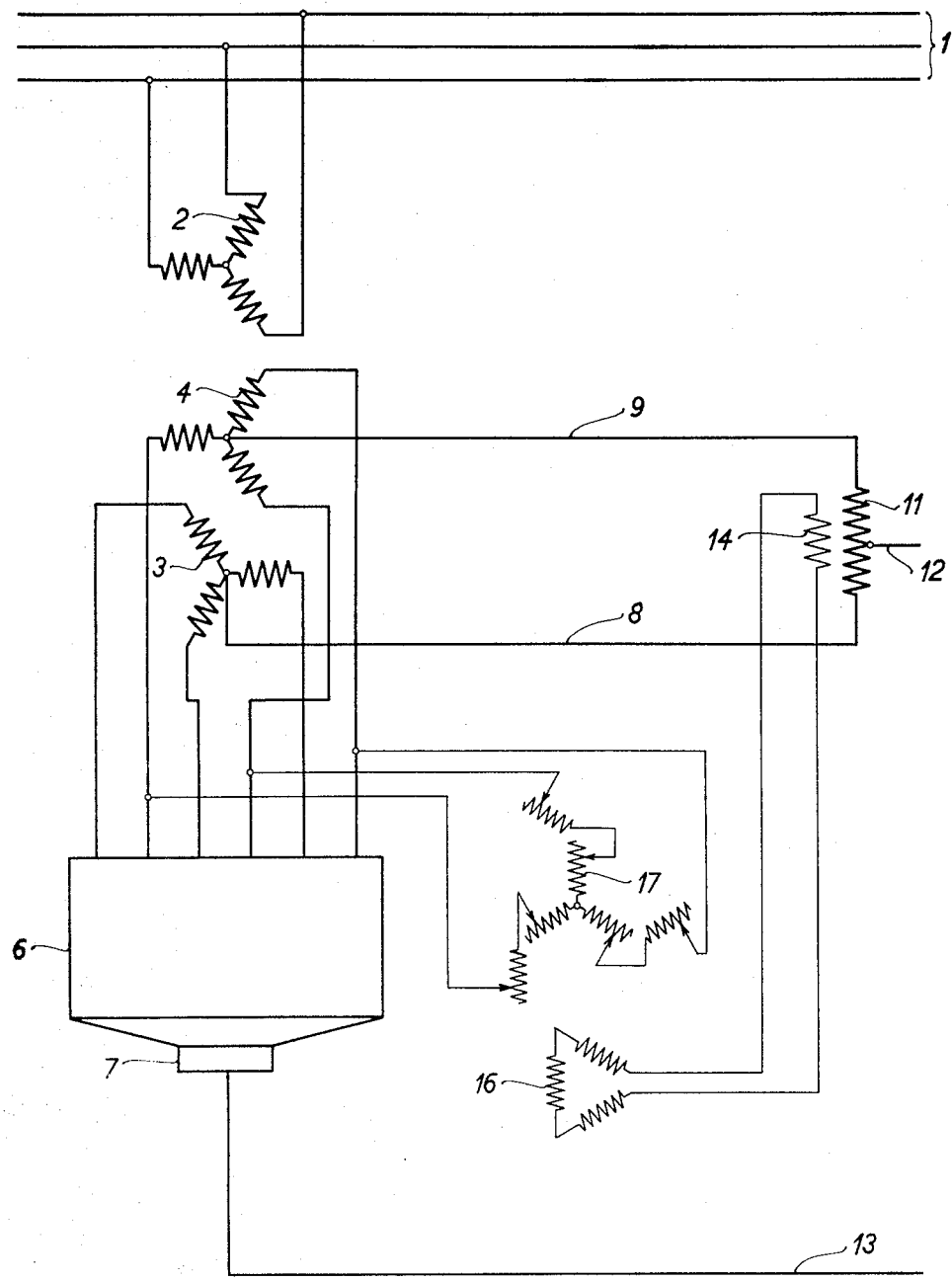
Inventor
Johannes Kubler
By Alfred N Dyson
Attorney Patented Mar. 20, 1934

1,951,575

UNITED STATES PATENT OFFICE 1,951,575

ELECTRIC CURRENT RECTIFYING SYSTEM

Johannes Kubler, Baden, Switzerland, assignor to Aktiengesellschaft Brown Boveri & Cie., Baden, Switzerland, a joint-stock company of Switzerland Application January 18, 1930, Serial No. 421,629
In Germany January 18, 1929

3 Claims. (Cl. 175—363)

This invention relates to improvements in metallic vapor electric current rectifying systems, and particularly to such rectifying systems of the general type disclosed in my Patent No. 1,800,838, and which are provided with means for preventing a voltage rise at light load or no load on the rectifier.

Auto-transformers or so-called absorption reactance coils are frequently used in electric current rectifying systems for the purpose of permitting a more effective use of the supply transformer system, of permitting the use of a smaller transformer, or to secure better voltage regulation during operation of the system. Such auto-transformers have a voltage which is a function of the load on the rectifier at light loads and approaches a constant at large loads. This result is due to the fact that the voltage drop through the auto-transformers is approximately proportional to the current at light load but changes only slightly at heavy load due to the saturation of the auto-transformers. The voltage of the auto-transformer is principally that of the third harmonic, and the magnetization current is that of the overwave of the rectifier current itself. The normal magnetization current produces a field of triple frequency which induces a voltage of triple frequency in the auto-transformer in such manner that the voltage is dependent on the load of the rectifier. To avoid a voltage increase in the system at light or no load on the rectifier, it is necessary to avoid this dependence of the voltage upon the load. Such effects may be obtained by impressing an auxiliary voltage upon the auto-transformer, as disclosed in my above patent which voltage will saturate the core of the auto-transformer even when all of the load is removed from the rectifier or the direct current line. This purpose may be accomplished most efficiently if the auxiliary voltage supplied to the auto-transformer is made adjustable in magnitude and phase angle so that the action of the auto-transformer is in accordance with that of the rectifier current at high load, thereby insuring an unimpaired saturation in the core of the auto-transformer under any load condition.

It is, therefore, among the objects of the present invention to prevent an increase in the voltage of a current rectifying system upon decrease in the load thereon.

Another object of the invention is to provide a rectifying system in which a magnetizing current of such character is supplied to an auto-transformer or absorption reactance coil as will remain substantially constant independently of the output load on the rectifier during periods in which the load on the rectifier is decreasing.

A further object of the invention is to provide an improved rectifying system with auto-transformers excited from a current source other than the usual source of current supply for the rectifying system proper.

Another object of the invention is to provide a rectifying system employing an auto-transformer in which the voltage and phase angle of the supply to the auto-transformer may be adjusted as desired.

Objects and advantages, other than those above set forth, will be apparent from the following description and the drawing which diagrammatically shows one examplary embodiment of the present invention.

Referring more particularly to the drawing by characters of reference, the reference numeral 1 indicates a multiphase supply line or source of alternating current of any desirable character. The supply line 1 is connected to the primary winding 2 of a transformer. This winding is preferably connected in star, as shown. The transformer secondary windings 3, 4 are also preferably connected in star. The terminals of the secondary windings 3, 4 are arranged to be connected to anodes (not shown) of a rectifying device 6 of the metallic vapor type which is provided with a cathode, indicated at 7, forming the negative electrode of the current rectifier 6. The direct current output circuit of the rectifier includes lines 8 and 9 connected to the neutral point of the secondary windings 3 and 4. The leads 8 and 9 are connected to the main winding 11 of an auto-transformer having a lead 12 taken from the midpoint thereof. The lead 12, accordingly, forms one side of the direct current output circuit, and the other side of the direct current output circuit is formed by a conductor 13 connected to the cathode 7 of the rectifier 6.

To prevent an increase in the output circuit voltage during periods of decreasing load thereof, the winding 11 of the auto-transformer is super-excited so that the voltage drop therethrough is no longer a pure function of the output circuit current, but remains substantially constant. Such super-excitation is produced by an exciting winding 14, arranged adjacent to the winding 11 and supplied from the secondary winding 16 of an auxiliary transformer, having coupled polyphase primary and secondary windings of which the respective phase sections of the primary winding 17 are connected to the terminals of corresponding phases of the secondary winding 4 of the rectifier supply transformer, as shown, or directly to the supply line 1, as may be most convenient. The respective phase sections of the primary winding 17 of the auxiliary transformer are divided into a plurality of phase displaced portions connected in zig-zag form with the several portions thereof tapped and provided with suitable tap switches for the purpose of permitting a change in the phase angle or voltage ratio or both the voltage ratio and phase angle of the voltages produced in the secondary winding 16 of such transformer.

The transformer 16, 17 is preferably highly saturated so that magnetization current for the auto-transformer 11 is supplied with an impressed voltage of a frequency corresponding to the third harmonic of the rectifier current, and, therefore, produces an excitation current in the auto-transformer corresponding to the third harmonic of the rectifier supply source. Even though the voltage in the secondary winding 4 of the rectifier supply transformer is predetermined and constant, due to the fact that the respective phase sections of the polyphase primary winding 17 of the auxiliary transformer are arranged as a plurality of tapped serially connected phase displaced portions forming variable zigzag connections, it is possible to change both the ratio and the phase angle of the voltages induced in the secondary winding 16, in the exciting coil 14, and in the winding 11 of the auto-transformer. The proper voltage relations may accordingly be maintained in the auto-transformer 11 independently of the load on the rectifier, so that it is possible to prevent a voltage rise in the output circuit of the rectifier when the rectifier is at light load or at no-load.

Although but one embodiment of the invention is illustrated and described, it will be apparent that various changes may be made therein and that various other embodiments are possible without departing from the spirit of the invention or from the scope of the appended claims.

The invention claimed is:

1. In combination with an alternating current line, a direct current line, an electric current rectifying means interconnecting said lines comprising, a transformer having a winding connected as two star connected polyphase systems, and an auto-transformer having a midtapped winding forming a connection between said direct current line and the star point connections of said polyphase systems, of means for exciting said auto-transformer comprising a transformer having a polyphase winding connected in zigzag fashion and energized from said alternating current line.

2. In combination with an alternating current line, a direct current line, an electric current rectifying means interconnecting said lines comprising, a transformer having a winding connected as two star connected polyphase systems, and an auto-transformer having a midtapped winding forming a connection between said direct current line and the star point connections of said polyphase systems, of means for exciting said auto-transformer comprising a transformer having a winding connected as a polyphase winding connected in zigzag fashion and energized from said alternating current line, and means for varying the effective number of turns of the last said winding.

3. In combination with an alternating current line, a direct current line, an electric current rectifying means interconnecting said lines comprising, a transformer having a winding connected as two star connected polyphase systems, and a transformer having a midtapped winding forming a connection between said direct current line and the star point connections of said polyphase systems and having an excitation winding, of means for exciting the second said transformer comprising a transformer having a polyphase winding connected in zigzag fashion energized from said alternating current line and having a polyphase open delta connected winding connected with said excitation winding of the second said transformer, and means for varying the effective number of turns of the respective phase sections of said zigzag winding.

JOHANNES KUBLER.